United States Patent [19]
Greenwood et al.

[11] Patent Number: 6,056,903
[45] Date of Patent: May 2, 2000

[54] PREPARATION OF POLYETHERSULFONE MEMBRANES

[75] Inventors: John M. Greenwood, Newton; James S. Johnson, Acton; Michael J. Witham, Grafton, all of Mass.

[73] Assignee: Osmonics, Inc., Minnetonka, Minn.

[21] Appl. No.: 09/246,242

[22] Filed: Feb. 8, 1999

[51] Int. Cl.⁷ ........................................... B01D 69/02
[52] U.S. Cl. .................. 264/41; 210/500.41; 427/244; 427/245; 521/64
[58] Field of Search ................. 264/41; 210/500.41; 427/244, 245; 521/64

[56] References Cited

U.S. PATENT DOCUMENTS

| | | | |
|---|---|---|---|
| 4,629,563 | 12/1986 | Wrasidlo | 210/500.43 |
| 4,774,039 | 9/1988 | Wrasidlo | 210/500.43 |
| 4,900,449 | 2/1990 | Kraus et al. | 210/500.39 |
| 4,964,990 | 10/1990 | Kaus et al. | 210/500.39 |
| 5,108,607 | 4/1992 | Kraus et al. | 210/500.39 |

*Primary Examiner*—Morton Foelak
*Attorney, Agent, or Firm*—Bruce F. Jacobs

[57] ABSTRACT

A method for making a skinless essentially symmetrical hydrophobic polysulfone microporous membrane by the steps of (a) forming a casting solution containing (i) a dissolved polyethersulfone polymer, (ii) a solvent for the polyethersulfone polymer, and (iii) a lower aliphatic glycol; (b) coating a substrate with the casting composition; (c) exposing the coated substrate to atmospheric conditions; (d) passing the exposed coated substrate into a precipitation bath to precipitate the membrane, the precipitation bath containing a lower aliphatic glycol and water; (e) rinsing the membrane; and (f) drying the membrane.

19 Claims, No Drawings

PREPARATION OF POLYETHERSULFONE MEMBRANES

FIELD OF THE INVENTION

The present invention relates to the preparation of skinless essentially symmetrical hydrophobic microporous polyethersulfone membranes which are useful in materials separations by filtration, dialysis, and the like, and as supports and containment media for materials, and related uses.

BACKGROUND OF THE INVENTION

Microporous membranes have many important applications in the electronics industry, food processing industry, the processing of biological materials, as sterilizing filters and the like. To make a microporous membrane with desired characteristics, known methods typically require that the temperature of the reaction conditions be carefully monitored and controlled within a narrow range. Normally as the temperature of a casting solution increases so does the average diameter of the pores in the resulting membrane, all other variables being constant. If the temperature of a casting solution is too high or low, the resulting membrane can have undesirable characteristics. The equipment, manpower and energy needed to control and monitor the temperature of reaction conditions makes known methods for making microporous membranes impractical and expensive.

It would be desirable to develop a method for making a microporous membrane that enables one skilled in the art to control the characteristics of the membrane without having to maintain careful control of temperature.

In membrane science, the term "skinned" usually refers to a membrane structure where the surface pores are much smaller than the interior pores. The skin is quite thin, usually on the order of 5% or less of the total membrane thickness and the transition to the much larger interior pores is abrupt. Skinned membranes have a disadvantage in that careful orientation to the fluid flow must be rigorously maintained otherwise throughput is drastically reduced. The flow through skinned membranes is generally controlled by the size of the pores in the skin layer and thus independent of the thickness. Also maintenance of precise membrane parameters can be difficult in that any imperfections in the skin layer will result in loss of critical separation capability. On the other hand, the term "asymmetric" refers to a condition where the surface pores, although somewhat smaller than those of the interior, nevertheless are similar in size. The pores enlarge gradually from the surface through the interior structure.

U.S. Pat. Nos. 4,629,563 and 4,774,039 disclose manufacturing "highly asymmetric" polyethersulfone membranes. The patents teach that the highly asymmetric and skinned structures are produced only from metastable mixes which precipitate polymer by any non-solvent addition, or by cooling the mix, or even upon standing. It is significant that later patents U.S. Pat. Nos. 5,171,445 and 5,188,734 from the same assignee modify the procedure and teach reducing air exposure to as little as possible (in any case less than 0.5 second). This is done to improve the physical properties of the product. Surprisingly, even when the more open side of the membrane faces the fluid stream there is reduced throughput compared to less asymmetric membranes.

U.S. Pat. No. 4,976,859 discloses a polyethersulfone membrane with an unusual cell structure. This product must be highly skinned because it shows " . . . a flow of fluid . . . which is largely independent of membrane thickness."

U.S. Pat. Nos. 4,900,449, 4,964,990, and 5,108,607 describe preparing hydrophilic polyethersulfone membranes by forming a solution of a hydrophobic polymer starting material and adding a high molecular weight (up to 10,000 daltons) polyethylene glycol prior to casting the polymer into a membrane. The high molecular weight polyethylene glycol is responsible for the initial hydrophilicity of the resulting polyethersulfone membrane. However, under process conditions the high molecular weight polyethylene glycol, a known wetting agent, slowly leaches out which both contaminates the filtrate and causes reduced wettability with time.

U.S. Pat. No. 5,444,097, induces phase separation in a polyethersulfone solution by heating.

It is an object of this invention to produce essentially unskinned and symmetrical polyethersuffone membranes from stable polymer mixes, which membranes have flow rate and throughput properties at least as good as prior art membranes in a range of pore sizes and with easily controlled process parameters. It is another object to produce a hydrophilic polyether sulfone membrane having very low extractables.

SUMMARY OF THE INVENTION

The present invention is directed to a method for making a skinless, essentially symmetrical, hydrophobic polysulfone microporous membrane by (a) forming a casting solution containing (i) a dissolved polyethersulfone polymer, (ii) a solvent for the polyethersulfone polymer, and (iii) an aliphatic glycol; (b) coating a substrate with the casting composition; (c) exposing the coated substrate to atmospheric conditions; (d) passing the exposed coated substrate into a precipitation bath to precipitate the membrane, the precipitation bath containing an aliphatic glycol and water; (e) rinsing the membrane; and (f) drying the membrane.

The invention is further directed to a membrane made by the method.

The method enables one skilled in the art to make a skinless hydrophobic microporous polysulfone membrane with desired pore diameters and bubble points by controlling (i) the composition of the casting solution, (ii) the time the coated substrate is exposed to atmospheric conditions before entering the precipitation bath, and (iii) the composition of the precipitation bath. The entire method can be carried out at room temperature, and as such is simpler than known methods for preparing polyethersulfone membranes which require careful monitoring and control of temperature.

The term "pore diameter" is used herein to represent the span across the pores of a membrane. It is not intended to suggest that all of the pores are circular.

DESCRIPTION OF THE PREFERRED EMBODIMENTS

The casting solution used in the present invention contains (i) a dissolved polyethersulfone polymer, (ii) a solvent for the polymer, and (iii) a lower aliphatic glycol or mixture thereof. The casting solution is stable at room temperature such that, unlike a dispersion, the solution is substantially homogenous.

The polyethersulfone polymer used herein can be any polyethersulfone polymer capable of being used in the casting solution in accordance with the invention. Suitable polyethersulfone polymers include those known with the trade names ULTRASON E from BASF, RADEL-A from AMOCO Chemicals, and the like.

A solution of the polyethersulfone polymer is formed in a mixture of a solvent for the polyethersulfone polymer solvent and one or more lower aliphatic glycol non-solvents. Generally the polymer is present in an amount that is at least about 7%, preferably from about 8 to about 20, and even more preferably from about 9 to about 13 wt %, based on the total weight of the solution.

While any suitable solvent for the polymer, e.g. pyrrolidones, dimethylacetate, dimethyl formamide, dimethylsulfoxide, and the like, may be used, the solvent is preferably a pyrrolidone. The pyrrolidone solvent can be any pyrrolidone-based liquid which is capable of dissolving the polyethersulfone polymer and of being used in the casting solution in accordance with this invention. Suitable such compounds include pyrrolidone and N-methylpyrrolidone. Most preferably, the solvent is N-methylpyrrolidone. The solvent is generally present to at least about 20, preferably from about 25 to about 50, and even more preferably from about 25 to 40 wt %, based on the total weight of the solution.

The selection of the aliphatic glycol non-solvent constituent is a key component of this invention. The aliphatic glycol can be any low molecular weight aliphatic glycol which is not sufficiently attracted to the polyethersulfone polymer to prevent complete removal of the glycol during routine washing such that the membrane as produced is hydrophobic. Generally the number of carbon atoms in the low molecular weight aliphatic glycol is from 2 to about 20, preferably from 2 to about 10, and more preferably from 4 to about 6. The lower molecular weight glycols are used since they are extracted more easily from the newly formed polyethersulfone membranes. However as the molecular weight of the glycol is reduced, the terminal hydroxyl groups represent an increasing fraction of the chemical attribute. As a consequence, the polyethersulfone mix will allow less glycol to be incorporated as the molecular weight of the glycol is reduced. This tendency can be offset by the masking of one (or both) of the terminal hydroxyl functions as an ether. Thus a polyethersulfone casting mix will tolerate more diethyleneglycolmonoalkylether than it will diethylene glycol.

A single low molecular weight glycol or glycol derivative or a mixture of the same is capable of being used in the casting solution in accordance with the invention. Suitable such glycol compounds include ethylene glycol, propylene glycol, butylene glycol, diethylene glycol, triethylene glycol, and the like. Particularly useful are diethylene glycol, triethylene glycol, and a mixture thereof. More preferably the non-solvent is diethylene glycol which has been found advantageous in the formation of membranes with pore sizes of about 1 micrometer and more, even as large as about 20 micrometers. When diethylene glycol is used alone, it is generally present in the mix in an amount of about 45–55 wt % based on the total weight of the solution. When triethylene glycol is used alone, it is generally present in the mix in an amount of about 55–65 wt % based on the total weight of the solution.

The casting solution, in addition to the dissolved polyethersulfone polymer, can contain other dissolved polymers. However compatible co-polymers are quite limited. Such compatible polymers are known in the industry and include polyvinylpyrrolidones, polyethyleneglycols, polyethylene oxides, and the like. U.S. Pat. No. 4,416,144 further identifies compatible polymers. The compatible polymers are generally used in amounts which do not change the hydrophobic character of the resulting cast membrane.

The casting solution can be formed by any conventional technique capable of forming a solution containing the dissolved polyethersulfone polymer in the solvent and the aliphatic glycol non-solvent. Preferably, the casting solution is made by first mixing the solvent, e.g. N-methylpyrrolidone, and the glycol, e.g. diethylene glycol, liquids with any suitable mixing device, then dissolving the polyethersulfone polymer into the liquid mixture with mixing until a substantially homogenous solution results. However, the precise order of component addition does not matter.

The casting solution can be prepared with known mixing devices that are used to blend solids and liquids into viscous fluids. The mixing time for dissolving the polyethersulfone polymer generally ranges up to about 4 hours for a 5 pound batch. The specific time will depend on the amount of polymer being dissolved, the physical state of the polymer, i.e. powder or pellet, and the type of mixing device. A finely powdered polymer will dissolve more quickly than an extruded pelletized polymer.

The polyethersulfone polymer is preferably added to the liquids for dissolution at a speed that is sufficient to prevent clumping. The polymer is dissolved at a temperature that is sufficiently low to prevent the casting solution from becoming unstable. One skilled in the art will appreciate that the unstable characteristics of the casting solution are reversible when the solution is cooled. Generally the temperature is about room temperature. Some of the casting solutions become cloudy at temperatures substantially higher than room temperature. Cooling the solution to 20–25° C. removes the cloudiness.

Mixes can be made where the upper phase inversion temperature is at, or even below, room temperature. Increasing the amount of the glycol (particularly diethylene glycol) beyond certain limits will produce these mixes. These mixes are undesirable from a manufacturing standpoint. Also the performance characteristics of membranes made from these mixes are poor.

After the casting solution has been made, the mix is generally filtered to remove any extraneous particles which might cause a problem in casting the resulting lacquer or produce occlusions in the resulting membrane. Any air bubbles created by the mixing step are also eliminated, preferably by allowing the solution to stand undisturbed prior to being cast into a membrane.

As is conventional in the art, film structures can be made by coating the casting solution onto an impervious support such as stainless steel, mylar or the like. Composite structures are made by impregnation of the casting solution into a porous support medium, such as non-woven cloths preferably made from polyester, polypropylene and functionally equivalent substrates. Often microporous membranes must be made in a rather narrow thickness range. However the polyethersulfone membranes of this invention are less sensitive to the thickness parameter. Membranes of this invention have been made with thicknesses from 50 to 250 micrometers. The casting solution is ordinarily cast onto the substrate by means of a doctor blade with a knife gap.

The thin layer of casting dope is then moved into a precipitation bath. The length of time that the layer of casting solution is exposed to atmospheric conditions before entering the precipitation bath is important in determining the ultimate pore size. Although differing pore sizes can be achieved by altering the composition of the casting solution, it is a convenient aspect of this invention that pore size control can be achieved simply by adjusting this air exposure parameter. By immediate transfer to the precipitation bath a pore size of about 0.1 micrometers can be obtained.

A delay in the transfer of up to 60 seconds or so will yield, from the same casting solution, pore sizes of up to 1 micron. Polyethersulfone solutions are very sensitive to water vapor and it is preferable that the air is not overly humid.

The thin layer of casting solution then enters into an aliphatic glycol precipitation bath. The composition of this bath is key to achieving the essentially symmetrical skinless structures. Generally the precipitation bath is prepared from the same aliphatic glycol used to prepare the casting solution, although a different glycol can be used in whole or in part. In addition preferably the precipitation bath contains a small amount of water or other strong non-solvent such as ethanol, methanol, or the like. Adding about 10% water to the precipitation bath has been found to speed up membrane formation, i.e. reduce the time for the membrane to set up completely. Adding more than about 20% has been found to start to cause undesirable skin formation on the exposed surface. As the water (or other strong non-solvent) content is increased, the microporous membrane quickly becomes more asymmetric and eventually becomes skinned as the level rises.

After the microporous membrane is fully precipitated (which can take about 1 minute), it is rinsed free of any residuals and dried using known techniques.

While generally the precipitation bath will contain the same glycol(s) that is used in the casting mix, a close homologue may also be used, e.g. diethyleneglycol in the casting mix and triethyleneglycol in the precipitation bath.

The membranes are skinless in that they do not have a spinodal or a binodal structure. The membrane essentially has no bimodal pore structure such that the pores of the membrane extend from one of its surfaces to the opposite surface and the pores are either substantially uniform in size or very slightly tapered from one surface to the other. The skinless structure of the membrane can be observed by scanning electron microscopy.

Alternatively, the skinless characteristic of the membrane can be recognized by the way water flows through the membrane. The membrane generally has a water flow rate equal to or better than currently available commercial filter of similar pore diameter rating. The water flow rate is generally at least 2.5 cc/cm$^2$/min/-psig, preferably from about 2.5 to about 3.5, and more preferably from about 2.9 to about 3.4 cc/cm$^2$/min/psig for a membrane with a water bubble point rating of 0.2 micrometers.

The hydrophobic characteristic of the membrane is evident in that when a sample is floated onto the surface of water for a period up to 5 seconds, it does not wet through.

The membrane is relatively free of unattached polymer particles which are commonly present for other commercial polyethersulfone membranes.

The microporous membranes have effective pore diameters that are at least 0.01 micrometers, preferably from about 0.1 to about 20 micrometers.

The hydrophobic membrane made in accordance with the invention can be made hydrophilic by subjecting it to a plasma surface treatment. To accomplish this, the membrane is placed in a plasma-generating chamber, the chamber pumped down to a suitable pressure, e.g., a vacuum of about 0.2 Torr, and a plasma generated at 500–1000 volts for about 30 seconds until the surface of the membrane is hydrophilic. The hydrophobic nature of membrane can also be modified by polymer grafting, polymer coating, adding functional groups by chemical means, and the like.

Having now generally described the invention, the same will become better understood by reference to the following specific examples, which are included herein for the purposes of illustration only and are not intended to be limiting of the invention. Unless otherwise specified, all parts and percents are by weight. Pore diameters are determined by bubble point (psi) and the flow rates are given in milliliters of water flowing per square centimeter per minute per psig of applied vacuum (ml/cm$^2$/min/psig).

EXAMPLE 1

To make a microporous membrane with an average pore diameter of about 0.2 micrometers, a solution is first prepared containing 63 parts triethylene glycol, and 27 parts N-methylpyrrolidone. To form a casting solution, 10 parts of a polyethersulfone polymer (Ultrason E-6000 from BASF) is added slowly with mixing until the polymer is fully dissolved.

Once the polymer is fully dissolved, the solution is screened through a fine non-woven polyester cloth to remove any coarse foreign particles and allowed to degas overnight. A clear, homogenous casting solution is formed.

The casting solution is then cast over a glass plate, into a uniform film by means of a doctor blade with a knife gap at a rate of about 1 ft/min. The coated substrate is exposed to the atmosphere for 15 seconds before passing into a precipitation bath which initially contains 90% triethylene glycol and 10% water.

The resulting membrane is rinsed free of residual solvents and dried in an oven at 100° C.

The membrane so produced is about 100 micrometers thick, hydrophobic, has a water bubble point of 55 psig (indicating a pore diameter of about 0.2 micrometers) and exhibits a water flow rate of 2.7 cc/cm$^2$/min/psig.

EXAMPLE 2

The procedure of Example 1 is repeated except that the casting solution contained 64 parts triethylene glycol, 27 parts N-methylpyrrolidone, and 9 parts polyethersulfone polymer. The coated substrate is exposed to the air for 15 seconds before passing into the precipitation bath.

The membrane thus produced is about 100 micrometers thick, hydrophobic, has a water bubble point of 36 psig (indicating a pore diameter of about 0.45 micrometers) and a water flow rate of 4.5 cc/cm$^2$/min/psig.

EXAMPLE 3

The procedure of Example 1 is repeated except that the coated substrate is exposed to the air for less than 3 seconds before passing into the precipitation bath.

The membrane thus produced is about 100 micrometers thick, hydrophobic, has a water bubble point of 75 psig (indicating a pore diameter of about 0.1 micrometers) and a water flow rate of 1.9 cc/cm$^2$/min/psig.

EXAMPLE 4

The procedure of Example 1 is repeated except that the casting solution contained 49 parts diethylene glycol, 41 parts N-methylpyrrolidone, and 10 parts polyethersulfone polymer. The coated substrate is exposed to the air for 30 seconds before passing into the precipitation bath which initially contains 90% diethylene glycol, and 10% water.

The membrane thus produced is about 100 micrometers thick, hydrophobic, has a water bubble point of 32 psig (indicating a pore diameter of about 0.45 micrometers), and has a water flow rate of 4.9 cc/cm$^2$/min/psig.

EXAMPLE 5

The procedure of Example 1 is repeated except that the casting solution contained 50 parts diethylene glycol, 42 parts N-methylpyrrolidone, and 8 parts polyethersulfone polymer. The coated substrate is exposed to the air for 16 seconds before passing into the precipitation bath which initially contains 90% diethylene glycol and 10% water.

The membrane thus produced is about 100 micrometers thick, hydrophobic, has a water bubble point of 12 psig (indicating a pore diameter of about 3 micrometers) and a water flow rate of 10.2 $cc/cm^2/min/psig$.

EXAMPLE 6

The procedure of Example 1 is repeated except that the coated substrate is exposed to the air for 40 seconds before passing into the precipitation bath which initially contains 90% diethylene glycol and 10% water.

The membrane thus produced is about 100 micrometers thick, hydrophobic, has a water bubble point of 5 psig (indicating a pore diameter of 10 micrometers) and a water flow rate of more than 30 $cc/cm^2/min/psig$.

What is claimed is:

1. A method of making a skinless, essentially symmetrical, hydrophobic, polysulfone microporous membrane comprising:
   (a) forming a casting solution containing (i) a dissolved polyethersulfone polymer, (ii) a solvent for the polyethersulfone polymer and (iii) an aliphatic glycol having about 2 to about 20 carbon atoms, at a temperature that is sufficiently low that the casting solution is stable;
   (b) coating a substrate with the casting solution;
   (c) exposing the coated substrate to atmospheric conditions;
   (d) passing the exposed coated substrate into a precipitation bath to precipitate the membrane, the precipitation bath predominantly containing an aliphatic glycol having about 2 to about 20 carbon atoms and water; and
   (e) rinsing the membrane; and
   (f) drying the membrane.

2. The method of claim 1, wherein the casting solution contains polyethersulfone polymer in an amount ranging from about 8 to about 20 wt %, based on the total weight of the solution.

3. The method of claim 1, wherein the solvent for the polyethersulfone polymer is in an amount ranging from about 10 to about 50 wt %, based on the total weight of the solution.

4. The method of claim 1, wherein the casting solution contains N-methylpyrrolidone in an amount ranging from about 25 to about 50 wt %, based on the total weight of the solution.

5. The method of claim 1, wherein the aliphatic glycol in the casting solution has about 2 to 10 carbon atoms.

6. The method of claim 5, wherein the casting solution contains diethylene glycol in an amount ranging from about 40 to about 60 wt %, based on the total weight of the solution.

7. The method of claim 5, wherein the casting solution contains triethylene glycol in an amount ranging from about 50 to about 70 wt %, based on the total weight of the solution.

8. The method of claim 1, wherein the casting solution comprises at least about 50% aliphatic glycol, based upon the total weight of the casting solution.

9. The method of claim 1, wherein the aliphatic glycol in the precipitation bath has about 2 to 10 carbon atoms.

10. The method of claim 1, wherein the aliphatic glycol in the precipitation bath is the same aliphatic glycol which is in the casting solution.

11. The method of claim 1, wherein the aliphatic glycol in the precipitation bath is a different aliphatic glycol from that which is in the casting solution.

12. The method of claim 1, wherein the precipitation bath contains diethylene glycol in an amount ranging from about 75 to about 100 wt %, based on the total weight of the solution.

13. The method of claim 1, wherein the precipitation bath contains triethylene glycol in an amount ranging from about 85 to about 100 wt %, based on the total weight of the solution.

14. The method of claim 1, wherein the precipitation bath contains water in an amount of about 25 wt % or less, based on the total weight of the solution.

15. The method of claim 1, wherein the coated substrate is exposed to atmospheric conditions for up to about 60 seconds.

16. The method of claim 1, further comprising the additional step of plasma treating the hydrophobic membrane to make it a hydrophilic membrane.

17. A method of making a skinless, microporous polyethersulfone membrane with a predetermined pore diameter ranging from about 0.1 to about 20 microns comprising the steps of:
   (a) forming a casting solution containing (i) about 8 to about 13 wt % dissolved polyethersulfone polymer, (ii) about 20 to about 50 wt % pyrrolidone solvent, and (iii) about 40 to about 70 wt % aliphatic glycol at a temperature that is sufficiently low to avoid the casting solution becoming unstable;
   (b) coating the casting solution onto a substrate;
   (c) exposing the coated substrate to atmospheric conditions for a period of from about 0.1 to about 60 seconds;
   (d) passing the exposed coated substrate into a precipitation bath to precipitate a skinless hydrophobic microporous membrane, the precipitation bath initially comprising about 75 to about 98 wt % aliphatic glycol, and about 25 to about 2 wt % water;
   (e) rinsing the membrane; and
   (f) drying the membrane.

18. The method of claim 17, wherein the temperature is from about 20 to about 32° C.

19. The method of claim 17, further comprising the step of plasma treating the membrane to form a hydrophilic skinless microporous membrane.

* * * * *